United States Patent [19]

Kennedy et al.

[11] 4,020,127
[45] Apr. 26, 1977

[54] BIGRAFT COPOLYMERS AND PROCESS FOR THE PREPARATION THEREOF

[75] Inventors: Joseph P. Kennedy, Copley, Ohio; Alain Vidal, Mulhouse, France

[73] Assignee: The University of Akron, Akron, Ohio

[22] Filed: Sept. 9, 1975

[21] Appl. No.: 611,634

[52] U.S. Cl. .................. 260/878 R; 260/879; 260/880 R; 260/884; 260/886

[51] Int. Cl.$^2$ .............. C08F 255/06; C08F 257/02; C08F 255/02; C08F 259/04

[58] Field of Search .......... 260/878 R, 879, 880 R, 260/884, 886

[56] References Cited

UNITED STATES PATENTS

| | | | |
|---|---|---|---|
| 3,644,584 | 2/1972 | Fryd | 260/880 R |
| 3,694,377 | 9/1972 | Kennedy et al. | 260/878 R |
| 3,904,708 | 9/1975 | Kennedy et al. | 260/878 R |
| 3,933,942 | 1/1976 | Kennedy et al. | 260/878 R |

FOREIGN PATENTS OR APPLICATIONS 6,614,976  4/1967  Netherlands ............ 260/878 R

*Primary Examiner*—Alan Holler
*Attorney, Agent, or Firm*—Hamilton, Renner & Kenner

[57] ABSTRACT

Disclosed is a novel bigraft copolymer comprising a polyhydrocarbon backbone selected from the class consisting of aromatic homopolymers, saturated and unsaturated hydrocarbon homopolymers, such homopolymers having halogen functionality and copolymers and terpolymers formed therefrom, and two different branches which are selected from the group consisting of monovinyl aromatic compounds and isoolefins. The bigraft copolymer is formed by the selective sequential cationic initiation of a first charge of one monomer onto the backbone at specific functional positions thereon and in the presence of a suitable solvent and an alkylaluminum compound. The resultant monograft copolymer is subsequently subjected to a second charge of another monomer, in the presence of a suitable solvent and an alkylaluminum compound, which becomes polymerized at the remaining, different functional positions available on the backbone. Also described are steps for substituting desired functional groups on the backbone and for the separation and purification of the mono and bigraft copolymer products.

25 Claims, 2 Drawing Figures

BIGRAFT COPOLYMERS AND PROCESS FOR THE PREPARATION THEREOF

BACKGROUND OF THE INVENTION

The present invention relates to bigraft copolymers having a polyhydrocarbon backbone containing allylic chlorines and bromines and grafts of two monomers, preferably selected from the group consisting of monovinyl aromatic compounds and isoolefins. The invention also relates to a process for the preparation of the bigraft copolymer described herein.

It is known that certain alkylaluminum compounds in conjunction with suitable polymer halides will initiate the cationic polymerization of many various olefins, e.g., isobutylene, styrene, isoprene, butadiene and the like. Two references which disclose such polymerizations are U.S. Pat. Nos. 3,904,708 and 3,933,942. Given the above-reference knowledge, one could expect to graft a suitable olefin onto a polymer backbone such as poly(ethylene-propylene-diene) (EPDM) which carries the requisite halogen functionality and, in fact, this work has been performed and the products, appearing as typical thermoplastic elastomers, have been studied.

Notwithstanding the present state of the art, we have found the literature to be devoid of teaching directed toward the cationic grafting of two different olefins onto EPDM rubber. This state of the art is believed to be attributable to the fact that the principle of selective sequential cationic initiation has not been known.

SUMMARY OF THE INVENTION

It is therefore an object of the present invention to provide two novel bigraft copolymers having elastomeric, polyhydrocarbon rubber backbones and grafts of monovinyl aromatic compounds and/or isoolefins, e.g., poly[(ethylene-co-propylene-co-1,4-hexadiene)-g-styrene-g-α-methylstyrene], abbreviated Nordel-g-PSt-g PαMeSt, and poly [(ethylene-co-propylene-co-1,4-hexadiene)-g-styrene-g-isobutylene], abbreviated Nordel-g-PSt-g-PIB.

It is another object of the present invention to provide a process for the preparation, by selective sequential cationic initiation, of the novel bigraft copolymers disclosed herein.

It is still another object of the present invention to provide a process which includes steps of the separation and purification of the novel bigraft copolymers.

These and other objects of the present invention and process will become apparent from the following specification and claims.

In general, the bigraft copolymers of the present invention include a backbone selected from the class consisting of aromatic homopolymers, saturated and unsaturated hydrocarbon homopolymers, such homopolymers having halogen functionality and copolymers and terpolymers formed therefrom. The backbone carries grafts of two different branches selected from the group consisting of monovinyl aromatic compounds and issoolefins such as styrene and isobutylene, respectively, and copolymers thereof. The novel bigraft copolymers are prepared by cationically initiating and polymerizing one of the bigraft monomers to the backbone, carrying two different functional groups, in the presence of a suitable solvent and an alkylaluminum co-initiator. After the monomer has been grafted onto the backbone at the sites of one of the functional groups, the reaction is terminated and the monograft product is isolated. Thereafter the monograft is contacted with the other of the desired bigraft monomers, in the presence of a suitable solvent and an alkylaluminum co-initiator. Subsequent to the grafting of the second monomer onto the backbone at the sites of the other of the two functional groups, the reaction is terminated and the bigraft product removed from the vessel. Also disclosed are steps for separating and purifying the mono and bigraft products which were developed in order to prepare and study the novel bigraft copolymers. Alternatively, the process may include steps whereby the two functional groups are substituted on the backbone, or one additional functional is substituted on a backbone possessing another functional group.

The novel bigraft copolymers of the present invention range in characteristics from that of a soft rubber to a hard plastic. Possible uses for the copolymers would be as a blending agent which, when admixed with conventional polystyrene, would improve impact resistance; as an additive to motor oil to improve viscosity; and, as a protective coating resistant to UV light and atmospheric conditions.

DETAILED DESCRIPTION OF THE PREFERRED EMBODIMENT

Figure 1:
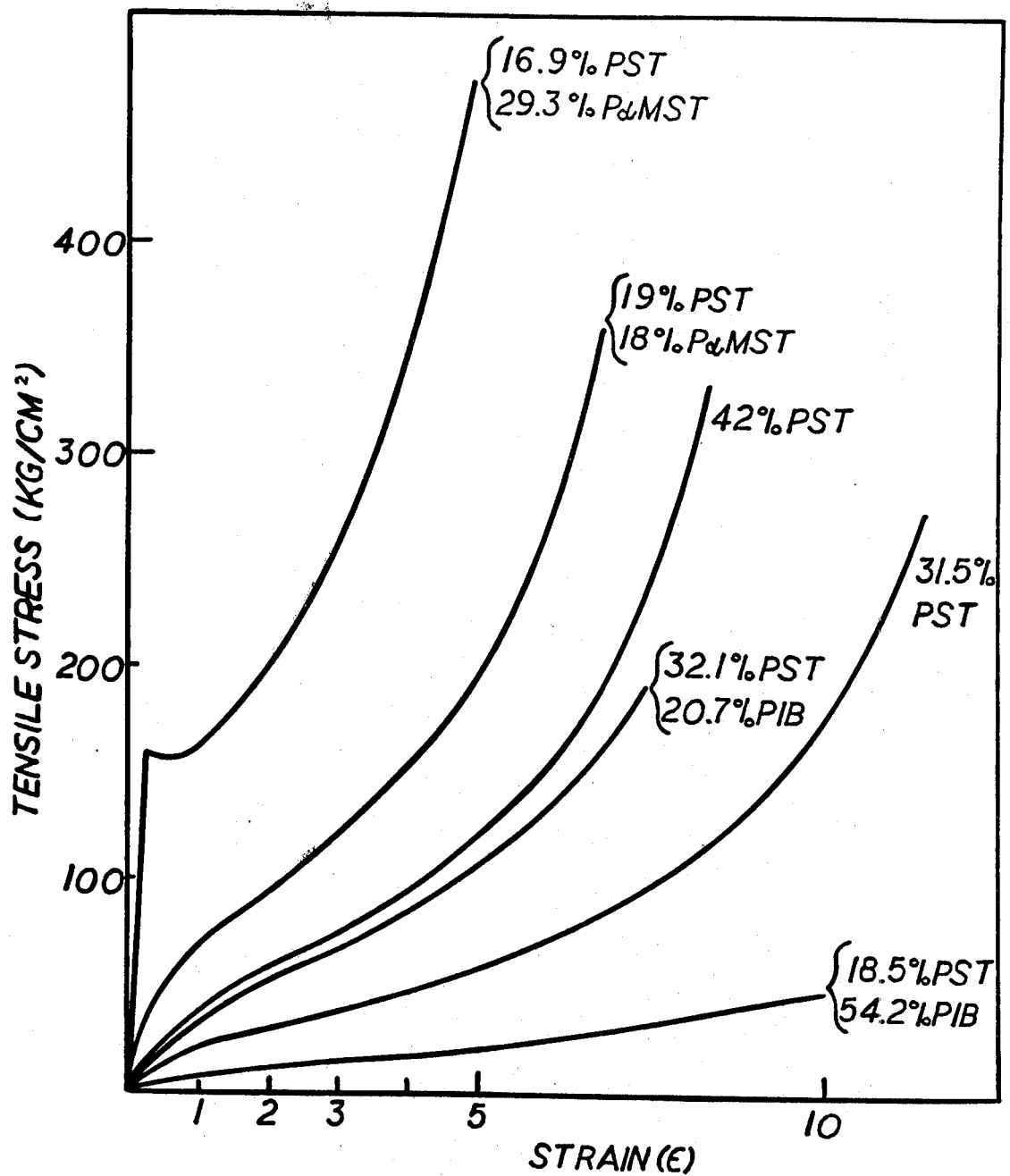
FIG. 1 graphically depicts the stress-strain properties of representative monograft and bigraft copolymers.

The polyhydrocarbon backbone selected for the experimental preparation of the novel bigraft copolymers of the present invention was poly(ethylene-co-propylene-1,4-hexadiene) commonly referred to as EPDM rubber. One particular source of EPDM which has worked well is Nordel 1440 obtained from E. I. DuPont de Nemours Inc. (Nordel being a registered trademark of theirs). The elastomeric backbone was purified and analyzed and found to possess approximately 3% by weight of 1,4-hexadiene, 47.5% ethylene and 49.5% propylene. The number average molecular weight determined by osmometry was 57,000. Other practical molecular weights for the backbone could range from about 500 to 500,000.

In addition to the EPDM backbone, other suitable polymers would include polyethylene, polypropylene, polystryene, polybutadiene, polyisoprene, polyvinyl chloride, SBR rubber, butyl rubber, polyvinylidene chloride and the like. Actually any polymer backbone capable of carrying a halogen on an allylic, tertiary or benzylic carbon is believed to be suitable. However, the backbone must not contain groups which would interfere with the catalyst or deactivate it, such as —CO, —COOR, —NH—, —SH and —NO$_2$. Thus, polymers such as polyacrylonitrile, polyacrylates, polyesters, nylons, polysulfides and the like are unsuitable for the formation of the bigraft copolymers of the present invention.

It is to be understood that the foregoing paragraphs are not to be construed as limiting but rather as enabling to one skilled in the art who may select from these and other compositions and molecular weights in order to practice the invention described herein.

The catalyst system of the present invention comprises a compound of the type $Al(M)_2X$, where M is a branched or straight chain alkyl group having from 1 to about 12 carbons and X is selected from the group consisting of M, hydrogen or halogen. Although the compound, i.e., alkyl-aluminum halide, is referred to as the catalyst it is to be remembered that the compound works with the polymer halide as a coinitiator system which will enable the cationic polymerization of the olefins to commence and proceed. Representative compounds which may be employed are listed in U.S. Pat. No. 3,694,377, the subject matter of which is hereby incorporated by reference. Two particularly useful compounds are diethylaluminum chloride, $Et_2AlCl$ and triethylaluminum, $Et_3Al$.

The monovinyl aromatic compounds which may be employed are styrene, alkylated styrenes having from 8 to about 20 carbon atoms per molecule and halogenated styrenes, with styrene, alpha-methylstyrene and p-chlorostyrene being preferred. Number average molecular weights for these branches may range from about 100 to 100,000.

The isoolefinic compounds which may be employed include isobutylene and related compounds having from 4 to about 8 carbon atoms per molecule. Number average molecular weights for these branches, when they are employed, may range from 100 to about 500,000. In addition to the homopolymer branches, copolymers such as butyl rubber may also be grafted on the backbone. Amounts of any of the graft monomers which may be employed in terms of weight % with respect to the polymer backbone range from approximately 1 to 95.

In order to provide the necessary halogen functionality to the EPDM backbone, particularly in allylic positions, the backbone was treated with t-butylhypohalites by dissolving the terpolymer in n-heptane, and adding the t-butylhypohalite under UV light and a nitrogen atmosphere. Reactants such as t-butylhyprochlorite and t-butylhypobromite were preferred to others such as N-chloro- or N-bromosuccinimide because of their high selectivity for halogen substitution at allylic positions. One useful halogenation procedure is reported by C. Walling and W. Thaler, *J. Amer. Chem. Soc.*, 83, 3877 (1961). It is preferable to chlorinate first and then brominate so as to avoid halogen displacement in the backbone.

Notwithstanding the employment of Cl and Br in the disclosure herein, it is contemplated that the other halogens, F and I, may also be employed as desired. Moreover, if a backbone such as polyvinyl chloride be selected, which already carries Cl groups, then it would only be necessary to substitute one other halogen thereon.

Reaction conditions under which the novel bigraft copolymers may be formed include polymerization times per grafting of from about 2 to 180 minutes and a temperature ranging from about $-50°$ to $20°$ C with $-30°$ C being preferred. It was observed that efficient cationic grafting was obtained only in the presence of 10–30% polar solvent, e.g., methyl chloride, methylene chloride ethyl chloride, etc. Inasmuch as Nordel is insoluble in a polar solvent, otherwise inert to alkylaluminums, a heptane-ethyl chloride mixture was selected for the grafting medium. However, Nordel dissolved only above $-40°$ C in a 90/10 (V/V ratio) or above $-30°$ C in a 85/15 n-heptane-ethyl chloride system. Thus, all subsequent grafting syntheses had to be carried out at $-30°$ or higher. These relatively high grafting temperatures necessarily led to somewhat decreased grafting efficiencies.

Separation and purification of the partial products, i.e., monografts was somewhat difficult but nonetheless necessarily precedent to the preparation of the novel bigraft product in good yields and relatively pure form. As might be expected, separation and purification of the bigraft products, although difficult, was also necessary for subsequent studies. Accordingly, we have set forth an operable procedure developed for this purpose.

Procedures employed for the synthesis of the novel bigraft copolymers claimed herein are set forth hereinbelow. The percent composition of the mono- and bigraft copolymers were determined by nmr with a Varian T60 spectrometer. Number average molecular weights were measured using solutions of the polymers in toluene on a HP 503 high speed membrane osmometer at $37°$ C. Gel permeation chromatrograms were recorded using a Waters Associates Ana-Prep Instrument, with dilute polymer solutions in tetrahydrofuran at $37°$ C.

1. Chlorobromination of Nordel 1440

To 34 g Nordel in 750 ml heptane was added 38.5 g (0.355 mole) t-butylhypochlorite at $45°$ C. The system was stirred and illuminated by UV light for about 90 minutes. Thereafter the polymer was coagulated in acetone and purified by 3 successive dissolutions in heptane and precipitation in acetone. Subsequently 33 g chlorinated Nordel (ClNordel) were dissolved in 750 ml n-heptane, 45.4 g (0.289 mole) t-butylhypobromite was added and UV irradiated for 120 minutes at $25°$ C. After coagulation in acetone, the chlorobrominated Nordel (ClBrNordel) was purified by 3 dissolutions in heptane and reprecipitation into acetone, then dried under vacuum.

The number average molecular weight of ClBrNordel determined on a high speed HP 503 osmometer was 57,000 and indicated that no breakdown occured during halogenation. The chlorine and bromine content of the polymer was 1.25% ($\sim$20 Cl atoms/chain) and 5.88% ($\sim$42 Br atoms/chain), respectively.

2. Syntheses and Purification of BrNordel-g-Polystyrene

Preliminary investigations were conducted to ascertain suitable experimental conditions for the grafting of styrene from chlorobrominated Nordel. These results have been summarized in Table I, hereinbelow.

TABLE I

| | | The Preparation of BrNordel-g-Polystyrene Monograft | | | | | |
|---|---|---|---|---|---|---|---|
| Run No. | Coinitiator (M) | Solvent V/V | T °C | Time min. | Conversion % | PSt in graft wt. % | G.E.* % |
| 1 | $Et_3Al(4 \times 10^{-2})$ | 90/10 | $-40$ | 60 | 0.5 | 3.5 | 70 |
| 2 | $Et_3AlCl(1.32 \times 10^{-2})$ | 90/10 | $-40$ | 10 | 1.5 | 12.8 | 84 |
| 3 | $Et_3Al(2 \times 10^{-2})$ | 85/15 | $-30$ | 60 | 0.3 | 2.5 | 82 |

TABLE I-continued

The Preparation of BrNordel-g-Polystyrene Monograft

| Run No. | Coinitiator (M) | Solvent V/V | T °C | Time min. | Conversion % | PSt in graft wt. % | G.E.* % |
|---|---|---|---|---|---|---|---|
| 4 | Et$_3$Al(4×10$^{-2}$) | 85/15 | −30 | 60 | 0.4 | 3.7 | 83 |
| 5 | Et$_3$Al(8×10$^{-2}$) | 85/15 | −30 | 60 | 0.35 | 2.3 | 60 |
| 6 | Et$_2$AlCl(1.32 × 10$^{-2}$) | 85/15 | −30 | 5 | 5.5 | — | — |
| 7 | Et$_3$Al(4×10$^{-2}$) | 80/20 | −30 | 60 | 0.42 | 3.5 | 76 |
| 8 | Et$_2$AlCl (1.32× 10$^{-2}$) | 80/20 | −30 | 60 | 18.5 | 62.5 | 75 |
| 9 | Et$_3$Al(4×10$^{-2}$) | 70/30 | −30 | 60 | 0.30 | 2.35 | 76 |
| 10 | Et$_2$AlCl(1.32 × 10$^{-2}$) | 70/30 | −30 | 5 | 93 | 83 | 34 |

Nordel: 13.3 g/l; Styrene = 1.5 M; Total volume = 30 ml
Solvent = n-heptane - ethyl chloride
*Grafting efficiency = (g of grafted PSt/g of total styrene converted) × 100

Experiments with Et$_3$Al coinitiator at various concentration levels, solvent composition, temperature and reaction times gave sufficiently high grafting efficiencies (75–80%), however, low styrene incorporation and slow rates. These observations may be due to fast alkylation or hydridation with Et$_3$Al at temperatures higher than −30° C. In contrast, Et$_2$AlCl gave satisfactory grafting efficiencies (34–84%) coupled with good styrene incorporation and relatively fast rates. Thus, it was decided to employ Et$_2$AlCl to initiate the polymerization of the first monomer, styrene.

For purification the crude product was dissolved in benzene and precipitated into acetone. This procedure has been found to be satisfactory to remove polystyrene from the BrNordel-g-polystyrene. Acetone is a good solvent for polystyrene up to an $\overline{M}n$ of ~100,000, whereas it was found to be a nonsolvent for the BrNordel-g-PSt.

The removal of unreacted ClBrNordel was accomplished by extraction with n-pentane. ClBrNordel was readily soluble in this solvent whereas the BrNordel-g-PSt was not; evidently the insoluble polystyrene branches kept the graft out of solution.

A typical synthesis of a BrNordel-g-PSt was carried out as follows: Into a suitable reaction vessel were charged 198 ml n-heptane, 50 ml ethyl chloride and 52 ml (1.5 M) styrene followed by a charge of 400 g (13.3 g/l) ClBrNordel which was dissolved in the mixture with stirring at −30° C under a blanket of dry nitrogen. Grafting was initiated by the introduction of the appropriate amount of Et$_2$AlCl co-initiator dissolved in an n-heptane-ethyl chloride mixture. The progress of the reaction was indicated by increasing turbidity in the reactor. Grafting was terminated by addition of prechilled methanol.

The purification of the graft was carried out by dissolution in benzene, centrifugation to eliminate aluminum oxides, and subsequent precipitation in acetone. This extraction was performed until graft composition by nmr spectroscopy remained constant.

Generally, three precipitations in acetone were sufficient. The sample was the dried until constant weight at 40° C under vacuum. Monomer conversion and grafting efficiency were obtained gravimetrically.

Unreacted ClBrNordel was removed by refluxing in n-pentane and precipitation into methanol. This extraction was continued until less than 50 mg of material was obtained. The composition of the pure BrNordel-g-PSt was determined by nmr spectroscopy (10% solution in CCl$_4$) and its homogeneity characterized by GPC (0.25% solution in THF). The molecular weights of the graft and of the homopolystyrene were measured by osmometry (1% solution in toluene). Cl and Br contents were determined by elemental analysis.

The solvent-extracted pure BrNordel-g-PSt has been characterized in terms of number average molecular weight (by osmometry) and overall composition (by nmr spectroscopy). Attempts have been made to calculate from the available information the branch/backbone (b/B) ratio. Table II presents representative data.

TABLE II

Synthesis and Characterization of BrNordel-g-PSt

| Coinitiator M | Solvent V/V | Conversion % | $M_{n_h}^1$ | $M_{n_g}^2$ | PSt in graft wt. % | G.E. % | b/B$^3$ |
|---|---|---|---|---|---|---|---|
| 1.32×10$^{-2}$ | 90/10 | 3 | 25,000 | 76,000 | 15.4 | 46 | 0.8 |
| 1.32×10$^{-2}$ | 85/15 | 5.5 | 37,400 | 98,000 | 17.6 | 40.5 | 1.1 |
| 1.32×10$^{-2}$ | 85/15 | 10 | 28,000 | 75,000 | 28.7 | 43 | 0.9 |
| 1.32×10$^{-2}$ | 80/20 | 16.6 | 36,500 | 99,500 | 31.5 | 30 | 1.16 |
| 1.32×10$^{-2}$ | 80/20 | 34.2 | 37,000 | 79,000 | 40.7 | 22.1 | 0.09 |
| 1.32×10$^{-2}$ | 80/20 | 48 | 35,500 | 98,000 | 42 | 24.5 | 1.15 |
| 0.66×10$^{-2}$ | 80/20 | 25.5 | 30,300* | 129,000 | 48.5 | 22.4 | 2.4 |

Coinitiator: Et$_2$AlCl; Styrene: 1.5 M; T = −30°C; ClBrNordel: 13.3 g/l;
Solvent = n-heptane - ethyl chloride. Total volume = 300 ml.
*M$_n$ by GPC = 21,700 M$_w$ = 56,300 M$_z$ = 50,400 M$_w$/M$_n$ = 2.5 g
$^1M_{n_h}$ = number average molecular weight of homopolystyrene extracted
$^2M_{n_g}$ = number average molecular weight of monograft
$^3$ b/B - branch per backbone To calculate the b/B ratio it was assumed that the $\overline{M}n$ of the acetone extractable homopolystyrene and that of the grafted branches were identical. With this assumption:

$$b/B = (\overline{M}n_g - \overline{M}n_b)/\overline{M}n_h$$

where $\overline{M}n_g$, $\overline{M}n_b$, and $\overline{M}n_h$ are the number average molecular weights of the graft, the backbone, and the homopolymer extracted from the crude product, respectively. According to these data, only a small number of branches have been created.

3. Synthesis and purification of Nordel-g-Polystyrene-g-Poly-α-methylstyrene A typical synthesis of a Nordel-g-PSt-g-PαMeSt was as follows: Into a suitable reaction vessel was charged a mixture of 169 ml n-heptane, 73 ml $C_2H_5Cl$ and 58 ml (1.5 M) alpha-methylstyrene (αMeSt) followed by a charge of 3.90 g (13 g/l) BrNordel-g-PSt which was dissolved therein at −20° under a blanket of dry nitrogen. Grafting was initiated by the introduction of the appropriate amount of $Et_2AlCl$ coinitiator dissolved in an n-heptane-ethyl chloride mixture. The appearance of turbidity indicated progress of the reaction. Grafting was terminated by addition of prechilled methanol.

The purification of the graft was carried out by extraction at room temperature with 3-pentanone. Complete separation was indicated by reaching constant graft-composition by nmr. Generally 4 extractions were enough. The removal of the unreacted BrNordel-g-PSt was performed by refluxing in methyl ethyl ketone (MEK). The recovery of less than 50 mg in the MEK soluble fraction was assumed to indicate complete separation.

After drying at 40° C under vacuum the Nordel-g-PSt-g-PαMeSt and PαMeSt fractions were characterized in respect to composition by nmr (10% solution in $CCl_4$) molecular weights by osmometry (1% solution in toluene) and homogeneity by GPC (0.25% solution in THF).

Reaction conditions used and results of grafting experiments with α-methylstyrene are shown in Table III. In these runs the polymerization of α-methylstyrene was initiated by introducing $Et_2AlCl$ into a quiescent mixture of BrNordel-g-PSt and α-methylstyrene at −20° C. To enhance the rate of grafting, the temperature was −20°, i.e., somewhat higher than that in the first grafting step.

These grafting reactions were initiated by BrNordel-g-PSt, the syntheses of which are shown in Table I. Specifically, graftings reported in lines 1, 2 of Table III have been initiated by the monograft shown in lines 1, 2 of Table I, respectively. The composition of the solvent mixture used in the second grafting step had to be adjusted to the polystyrene content of the monograft. For example, in Run No. 8 with 62.5% PSt the ethyl chloride concentration has to be increased to 30% volume because of the insolubility of polystyrene in a heptane-rich medium.

A comparison of results obtained in $Et_3Al$ and $Et_2AlCl$ confirmed earlier conclusions of ours in regard to preferential alkylation with $Et_2AlCl$. Comparing the conversions obtained with $Et_3Al$ and $Et_2AlCl$, i.e., conversions obtained in experimentals 1 and 2, and 7 and 8 in Tables I and III, it is seen that consistently much higher (lower) conversions are obtained when $Et_2AlCl$ ($Et_3Al$) is used in the first step.

In a similar vein, the conversions in experiments 3, 4 and 5 in Table III decrease with increasing $Et_3Al$ concentrations for the same runs shown in Table I. All these observations can be explained by assuming that $Et_3Al$ alkylates and thus decreases the number of active halogen sites.

TABLE III

Details of the Synthesis of Nordel-g-PSt-g-PαMeSt

| Run No. | Solvent V/V | Time min. | Conversion % | Total Branch Content wt. % | PαMeSt in Graft wt. % | G.E. % |
|---|---|---|---|---|---|---|
| 1 | 85/15 | 5 | 30 | 34.5 | 30.9 | 10 |
| 2 | 85/15 | 5 | 83 | 55 | 42.2 | 4.7 |
| 3 | 85/15 | 5 | 13.8 | 27.5 | 25 | 14 |
| 4 | 85/15 | 10 | 6.65 | 21.1 | 18 | 25.2 |
| 5 | 85/15 | 10 | 4.8 | 19.5 | 16.3 | 21.5 |
| 7 | 85/15 | 5 | 7.2 | 19.3 | 18 | 19 |
| 8 | 70/30 | 5 | 82.5 | 51.5 | 19 | 3.3 |
| 9 | 85/15 | 5 | 5.9 | 22.6 | 21 | 25 |
| 10 | 50/50 | — | — | Insoluble | — | — |

Coinitiator = $Et_2AlCl$ (1.32 to $^{-2}$M); α-Methylstyrene = 1.5 M; T = −20°C
BrNordel-g-PSt = 13.3 g/l. Solvent = n-heptane - ethyl chloride.
Total volume = 30 ml The purification of the Nordel-g-PSt-g-PαMeSt bigraft was somewhat difficult regarding the clean removal of homopoly-α-methylstyrene from the Nordel-g-PSt-g-PαMeSt bigraft. However, it was found that cold 3-pentanone is a good solvent for the homopolymer and a nonsolvent for the bigraft.

The removal of unreacted BrNordel-g-PSt from the mixture could be accomplished with refluxing methyl ethyl ketone (MEK). Each extraction step was followed by nmr spectroscopy and sometimes also by GPC. Extraction was continued until constant bigraft composition by nmr was obtained. The GPC trace of the product was dimodal, but after repeated 3-pentanone extraction, the GPC traces of the two fractions became monomodal. Nmr analysis of the 3-pentanone soluble low molecular weight fraction revealed PαMeSt (90%) and bigraft (10%) whereas the insoluble fraction was indicated to contain Nordel (36.9%) plus PSt (29.3%) plus PαMeSt (33.8%), i.e., the unreacted monograft and the bigraft. Subsequent extraction with MEK resulted in essentially pure bigraft (97%). Nmr analysis of the MEK soluble fraction indicated Nordel 23%, PSt 37.3% and PαMeSt 39.7%. The pure Nordel-g-PSt-g-PαMeSt was defined in terms of number average molecular weight (by osmometry), aromatic branch content including PSt and PαMeSt (by nmr), and b/B ratio. The latter was calculated by determining the $\overline{Mn}$ of the 3-pentanone extractable PαMeSt and making the assumption concerning the branch molecular weight determining mechanism as explained above. Table IV summarizes these data.

TABLE IV

Synthesis and Characterization of Nordel-g-PSt-g-PαMeSt

| Coinitiator M | Solvent V/V | Conversion % | $Mn_h$ | $Mn_g$ | Total Branch Content wt.% | PαMeSt in graft wt.% | G.E. % | b/B for PαMeSt |
|---|---|---|---|---|---|---|---|---|
| 1.32 10⁻² | 85/15 | 17 | 49,000 | 147,000 | 37 | 18 | 8.1 | 1.5 |
| 1.32 10⁻² | 80/20 | 19 | 51,500 | 189,000 | 46.2 | 29.3 | 11.7 | 1.8 |
| 0.393 10⁻² | 80/20 | 7 | 58,500 | 180,000 | 30.9 | 20.2 | 10.7 | 1.4 |
| 1.32 10⁻² | 70/30 | 78 | 30,000 | 250,000 | 61.5 | 34.9 | 4.5 | 5 |
| 0.99 10⁻² | 70/30 | 43.5 | 37,200 | 275,000 | 65.6 | 45 | 7 | 5 |
| 0.91 10⁻² | 70/30 | 32.7 | 48,100 | 400,000 | 62.4 | 33.1 | 11.5 | 5 |

Coinitiator = Et$_2$AlCl; α-Methylstyrene = 1.5 M; T = −20° C; BrNordel-g-PSt ∼ 13 g/l; Solvent - n-heptane - ethyl chloride; Total volume = 300 ml.

4. Synthesis and Purification of Nordel-g-Polystyrene-g-Polyisobutylene

A typical synthesis of a Nordel-g-PSt-g-PIB was performed as follows: Into a suitable reaction vessel were charged 180 ml n-heptane, 66.4 ml ethyl chloride and 42.6 ml (1.5 M) of isobutylene followed by a charge of 3.50 g (11.7 g/l) BrNordel-g-PSt which was dissolved in the mixture with stirring at −30° C under a blanket of dry nitrogen. Grafting was initiated by the introduction of Et$_2$AlCl coinitiator dissolved in an n-heptane-ethyl chloride mixture. The reaction was quenched by addition of prechilled methanol as soon as the temperature increase was 2° C. Under our conditions this increase was found to correspond to a monomer conversion of 5 to 10%.

After precipitation in methanol and drying at 40° C under vacuum, monomer conversion was calculated gravimetrically. The purification of the graft was carried out by extraction either at room temperature with n-pentane by stirring the reaction mixture in the solvent to dissolve the homo-PIB, or by refluxing in 3-pentanone to dissolve the bigraft copolymer. Each extraction was monitored by nmr spectroscopy. It was found that, in general, 4 successive extractions gave complete separation. The recovery of less than 50 mg of sample in the soluble phases was also assumed to indicate complete separation. The homopolymer and the bigraft Nordel-g-PSt-g-PIB were characterized by nmr spectroscopy and osmometry in respect to their compositions and molecular weights.

Synthesis conditions and representative data for six examples are combined in Table V.

The purification of the bigraft was difficult inasmuch as the solubility characteristics of Nordel-g-PSt-g-PIB and PIB were very similar.

If isobutylene conversions are high, e.g., lines 1 and 2 of Table V, the bigraft contains large amounts of PIB and separation of PIB from the bigraft becomes very difficult. In these instances fractionation with 3-pentanone or with n-pentane yields two fractions, one containing PIB plus PIB-rich bigraft and the other the PIB-poor bigraft plus the unreacted monograft. This undesirable situation was alleviated by operating at low isobutylene conversions.

It was found that as long as the PIB content in the bigraft does not exceed ∼30%, i.e., isobutylene conversion is kept below 15%, satisfactory separation of PIB and bigraft can be achieved. n-Pentane and 3-pentanone were employed in the separation procedure. n-Pentane was suitable to extract PIB while refluxing 3-pentanone was found to dissolve Nordel-g-PSt-g-PIB containing less than ∼30% PSt which is our experiments occurred when the PIB content was more than 30%, i.e., at a Nordel/PSt/PIB ratio of 40/30/30. However, neither of the two extraction processes was fully efficient because bigraft always accompanied homo-PIB. Thus, both the n-pentane soluble and the 3-pentanone insoluble fractions contained only 70–80% PIB.

The bigraft and unreacted monograft occur in the n-pentane insoluble or 3-pentanone soluble fractions. On the basis of experience gained with the αMeSt-bigraft system it was assumed that the second grafting step with isobutylene was also virtually complete and thus very little if any monograft remained in our PIB-bigraft system. Consequently, attempts were not made

TABLE V

Synthesis and Characterization of Nordel-g-PSt-g-PIB

| Coinitiator M | Solvent V/V | Conversion % | $Mn_h$ | $Mn_g$ | Total Branch Content wt. % | PIB in graft wt. % | G.E. % | b/B for PIB |
|---|---|---|---|---|---|---|---|---|
| 1.32 × 10⁻² | 70/30 | 44.05 | 99,300 | 190,000 | 64.0 | 47.2 | 23.7 | 1.0 |
| 1.32 × 10⁻² | 70/30 | 79.0 | 55,500 | 151,500 | 62.7 | 54.2 | 16.0 | 1.3 |
| 0.66 × 10⁻² | 70/30 | 11.25 | 82,500 | 200,000 | 35.7 | 14.5 | 13.7 | 1.2 |
| 0.66 × 10⁻² | 70/30 | 4.80 | 59,000 | 151,500 | 52.8 | 20.7 | 51.7 | 1.2 |
| 0.66 × 10⁻² | 70/30 | 5.87 | 48,000 | 151,500 | 56.2 | 21.4 | 56.5 | 0.9 |
| 0.66 × 10⁻² | 70/30 | 5.6 | 57,700 | 300,000 | 55.5 | 23.1 | 50 | 3.5 |

Coinitiator: Et$_2$AlCl; Isobutylene = 1.5 M; T = −30° C; BrNordel-g-PSt ∼11.7 g/l; Solvent = n-heptane - ethyl chloride; total volume = 390 ml.

To facilitate bigraft purification by solvent extraction and to slow down the polymerization rate, it was necessary to keep isobutylene conversions low. This was achieved by using relatively low Et$_2$AlCl coinitiator concentrations (0.66 × 10⁻² M).

to extract the BrNordel-g-PSt monograft from the Nordel-g-PSt-g-PαMeSt bigraft and the possibility therefore exists that small amounts of monograft is contaminating our bigraft product.

The pure Nordel-g-PSt-g-PIB was characterized in terms of number average molecular weights, aromatic and aliphatic branch content and b/B ratio. The latter was caluclated by determining the $\overline{Mn}$ of the extractable polyisobutylene and comparing it to the number average molecular weight of the graft. As seen in Table V only a limited number of branches were obtained even in a medium containing 30% polar solvent. Low b/B values may be explained by backbone fractionation during PIB extraction. Evidently, bigrafts containing large amounts of PIB branches and homo-PIB possess very similar solubility characteristics and therefore, upon solvent extraction, PIB-rich bigraft is removed together with homo-PIB. Indeed, the so-called homo-PIB fraction contains only 70–80% PIB.

5. Stress-Strain Studies

Some stress-strain properties of monografts, i.e., Nordel-g-PSt and Nordel-g-PαMeSt, and bigrafts, i.e., Nordel-g-PSt-g-PαMeSt and Nordel-g-PSt-g-PIB are presented in Table VI. Representative stress-strain curves are given in FIG. 1 and the effect of the glassy polymer (PSt and PαMeSt) content on the 300% modulus of mono and bigrafts is shown in FIG. 2. The dotted line in FIG. 2 is merely an indication of expected trend and is not meant to convey an established relationship.

shows the characteristics of a tough plastic exhibiting a yield point (FIG. 1) whereas the monograft containing 42% PSt appears as a typical thermoplastic elastomer. It is possible that this difference is at least partly due to the differences in the branch/backbone ratios of these materials: While the bigraft contains an average of 1 PSt and 5 PαMeSt branches, the monograft only carries 1 PSt branch per backbone.

A comparison between the stress-strain curve of the bigraft containing 19% PSt and 18% PαMeSt (total glassy material content: 37%) and that of the monograft with 42% PSt suggests that more reinforcement is obtained when the Tg of the glassy domain is higher.

The grafting of PIB branches to a Nordel-g-PSt also gives thermoplastic materials, however, with much reduced strength properties. Thus the tensile strength and modulus significantly decrease by reducing the relative amount of the glassy domain in monograft No. 4 (40.7 wt. % PSt) to 18.5 and 32.1 wt. % in bigrafts Nos. 4A and 4B, respectively. The same phenomenon is noticeable by comparing monograft No. 5 with bigrafts 5A and 5B, respectively. Apparently the stress-strain properties of these thermoplastics are largely determined by the characteristics of the glassy domain

TABLE VI
Physical Properties of Mono- and Bigrafts

| Genealogy | Graft Composition (wt%) | Modulus, 300% (kg/cm²) | Tensile Strength (kg/cm²) | Elongation (%) | Permanent Set (%) |
|---|---|---|---|---|---|
| | Monograft Nordel/PSt | | | | |
| 1 | 82.4/17.6 | 10.3 | 171 | 1520 | 100 |
| 2 | 71.3/28.7 | 19.5 | 168 | 1150 | 60 |
| 3 | 68.5/31.5 | 39.0 | 274 | 1100 | 115 |
| 4 | 59.3/40.7 | 72.8 | 316 | 880 | 210 |
| 5 | 58/42 | 72.4 | 330 | 835 | 183 |
| | Nordel/PαMeSt | | | | |
| | 66/34 | 94.7 | 318 | 745 | 165 |
| | Bigraft Nordel/PSt/PαMeSt | | | | |
| 1A | 69.1/10.7/20.2 | 59.7 | 355 | 961 | 160 |
| 1A' | 63/19/18 | 119.7 | 359.0 | 675 | 210 |
| 1B | 53.8/16.9/29.3 | 250.8 | 475 | 191 | 305 |
| 2A | 34/26.6/39.4 | 360.8 | 431 | 353 | 230 |
| | Nordel/PSt/PIB | | | | |
| 4A | 27.3/18.5/54.2 | 13.2 | 47 | 1095 | — |
| 4B | 47.2/32.1/20.7 | 67.9 | 190 | 745 | 165 |
| 5A | 43.8/31.8/24.4 | 53.6 | 156 | 795 | 135 |
| 5B | 44.5/32.4/23.1 | 73.6 | 235 | 915 | 180 |

The first column in Table VI indicates the genealogy of the bigrafts. For example, monograft 1 was used to prepare 1A and 1B bigrafts, monograft 2 was used to initiate the grafting reaction resulting in 2A bigraft, etc.

The stress-strain properties of a Nordel-g-PSt (25% PSt)-Nordel-g-PαMeSt (22% PαMeSt) blend have also been determined: Modulus, 300% = 16.6 kg/cm², tensile strength = 28.7 kg/cm², elongation: 1095%, permanent set: 130.4%, true stress: 71.3 kg/cm².

Figure 2:
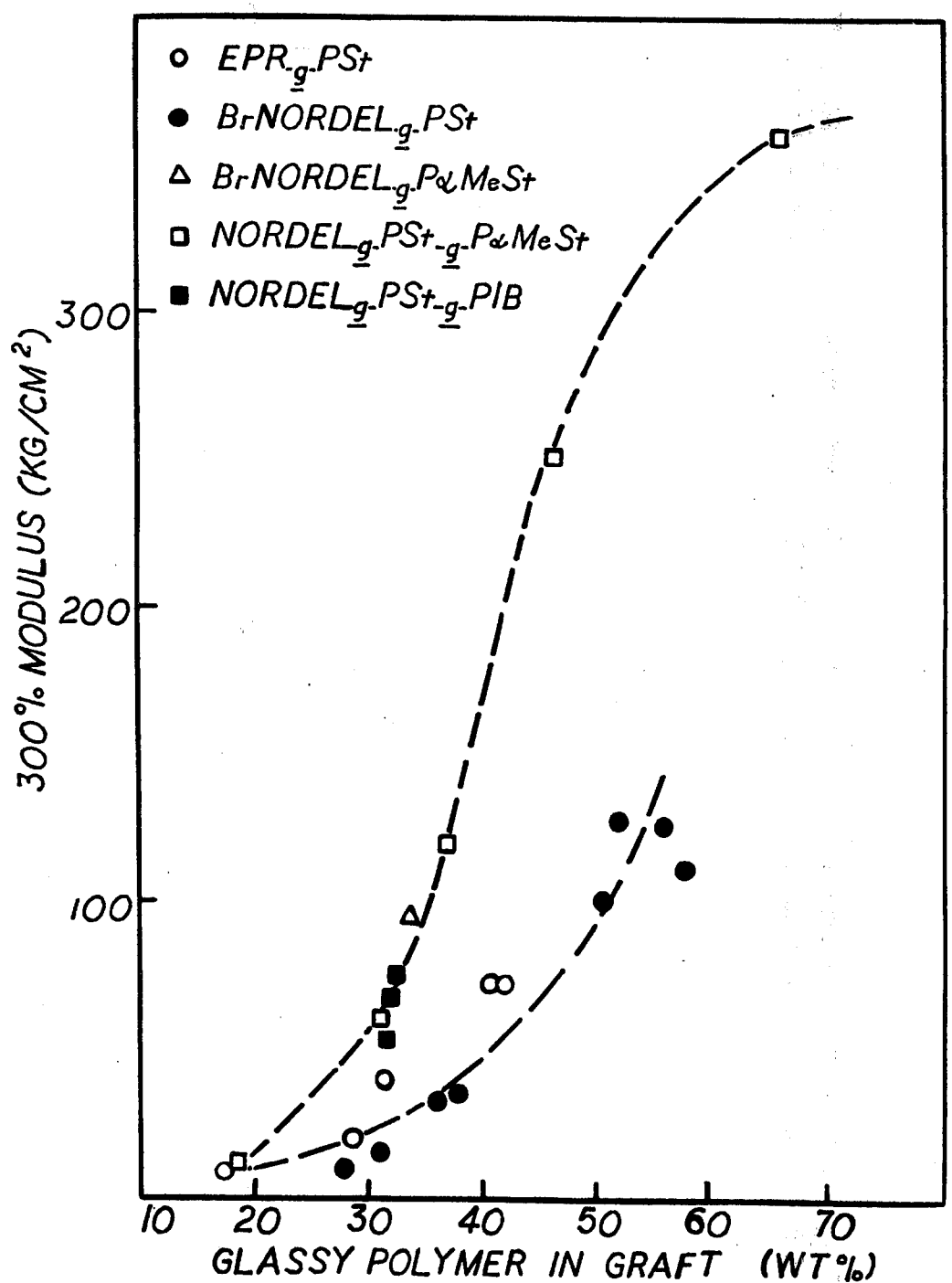
FIG. 2 graphically depicts the 300% modulus of monograft and bigraft copolymers plotted against glassy material content.

According to the data in Table VI and FIGS. 1 and 2, tensile strength, modulus and permanent set increase while elongation decreases with the amount of glassy component in the monograft. It is noteworthy that the tensile strengths of two monografts, one containing 40.7 wt. % PSt and the other 34 wt. % PαMeSt, are virtually identical.

The grafting of a second glassy polymer, pαMeSt, from an elastomer, Nordel, already containing a glassy polymer, PSt, further increases the tensile properties, moduli and permanent set. Pertinent data are presented in Table I, and FIGS. 1 and 2. It is interesting to note that the Nordel-g-PSt-g-PαMeSt bigraft containing 16.9% PSt and 29.3% PαMeSt (1B, Table VI)

and much less by the nature and molecular weight of the rubbery phase.

Thus it can be seen that the disclosed invention carries out the objects of the invention set forth above. As will be apparent to those skilled in the art, properties of the novel bigraft copolymers can be varied by selection of the resultant molecular weight and percent composition of the product and, it is believed that the preparation of these can be obtained without departing from the spirit of the invention herein disclosed and described, the scope of the invention being limited solely by the scope of the attached claims.

We claim:
1. A bigraft copolymer product comprising:
   a polymer backbone selected from the class consisting of saturated and unsaturated hydrocarbon homopolymers, copolymers and terpolymers, such polymers having halogen functionality and
   a plurality of at least two different graft polymer branches wherein said polymer branches are formed from monomers selected from the group consisting of monovinyl aromatic compounds having from about 8 to 20 carbon atoms per molecule and isoolefins having from 4 to about 8 carbon atoms per molecule.

2. A bigraft copolymer product, as set forth in claim 1, wherein said backbone carries two different branches.

3. A bigraft copolymer product, as set forth in claim 2, wherein said backbone comprises poly(ethylene-co-propylene-co-1,4-hexadiene) and
said graft polymer branches are formed from monomers selected from the group consisting of styrene, isobutylene and α-methyl styrene.

4. A bigraft copolymer product, as set forth in claim 1, wherein the number average molecular weight of said backbone is from about 500 to about 500,000;
the number average molecular weight of said monovinyl aromatic branches is from about 100 to 100,000; and,
the number average molecular weight of said isoolefin branches is from about 100 to 100,000.

5. A bigraft copolymer product, as set forth in claim 1, wherein the weight % of said backbone is from about 1 to about 95;
the weight % of said monovinyl aromatic branches is from about 1 to 95; and,
the weight % of said isoolefin branches is from 0 to about 95.

6. A process for the preparation of a bigraft copolymer from a backbone selected from the class consisting of saturated and unsaturated hydrocarbon homopolymers, copolymers and terpolymers and monomers forming a plurality of branches to be grafted therefrom selected from the class consisting of monovinyl aromatic compounds and isoolefins comprising the steps of:
substituting a first functional group, capable of initiating cationic polymerization, onto said backbone;
substituting a second functional group, capable of initiating cationic polymerization and generally less reactive than said first functional group, onto said backbone;
charging a reaction vessel with a suitable solvent, said backbone carrying said first and second functional groups and the first of said graft branch monomers;
adding a catalytic amount of an alkylaluminum compound with continuous mixing at a temperature of from about 5° C to about 20° C for a period of time of from about 2 minutes to 180 minutes so as to form a monograft copolymer wherein said first grafts are polymerized from said backbone at the site of said first functional group;
terminating the reaction;
charging a reaction vessel with said monograft copolymer and the second of said graft branch monomers;
adding a catalytic amount of an alkylaluminum compound with continuous mixing at a temperature of from about −40° C to about 0° C for a period of time from about 2 minutes to 180 minutes so as to form the bigraft copolymer wherein said second grafts are polymerized from said backbone at the site of said second functional group; and,
thereafter terminating the reaction and separating the bigraft product from the reaction vessel.

7. A process for the preparation of a bigraft copolymer, as set forth in claim 6, wherein said backbone comprises poly(ethylene-co-propylene-co-diene) and said first and second functional groups are halogens.

8. A process for the preparation of a bigraft copolymer, as set forth in claim 7, wherein said first functional group is Cl and is substituted on said backbone by the steps of:
charging a reaction vessel with said backbone, a suitable solvent and t-butyl-hypochlorite;
illuminating the reactants by UV light for approximately 90 minutes; and,
thereafter separating the chlorinated product from the reaction vessel.

9. A process for the preparation of a bigraft copolymer, as set forth in claim 8, wherein said second functional group is Br and is substituted on said chlorinated backbone by the steps of:
charging a reaction vessel with said chlorinated backbone, a suitable solvent and t-butylhypobromite;
illuminating the reactants by UV light for approximately 120 minutes; and,
thereafter separating the chlorinated brominated product from the reaction vessel.

10. A process for the preparation of a bigraft copolymer, as set forth in claim 6, wherein said first graft branch monomer is a monovinyl aromatic compound;
said solvent comprises a mixture of heptane and ethyl chloride; and,
said first alkylaluminum compound has the formula $Al(M)_2X$ wherein M is selected from the group consisting of branched and straight chain alkyl groups having from 1 to about 12 carbon atoms, and X is selected from the group consisting of M, H and halogens.

11. A process for the preparation of a bigraft copolymer, as set forth in claim 10, wherein said monovinyl aromatic compound is styrene and said alkylaluminum compound is diethylaluminum chloride.

12. A process for the preparation of a bigraft copolymer, as set forth in claim 6, wherein said second graft branch monomer is different from said first graft branch monomer and is selected from the group consisting of a monovinyl aromatic compound and an isoolefin;
said solvent comprises a mixture of heptane and ethyl chloride; and,
said second alkylaluminum compound has the formula $Al(M)_2X$ wherein M is selected from the group consisting of branched and straight chain alkyl groups having from 1 to about 12 carbon atoms, and X is selected from the group consisting of M, H and halogens.

13. A process for the preparation of a bigraft copolymer, as set forth in claim 12, wherein said monovinyl aromatic compound is α-methylstyrene, said isoolefin is isobutylene and said alkylaluminum compound is diethylaluminum chloride.

14. A process for the preparation of a bigraft copolymer, as set forth in claim 6, comprising the further steps of:
purifying said monograft and bigraft copolymer products.

15. A process for the preparation of a bigraft copolymer, as set forth in claim 14, wherein said monograft product comprises Br-poly[(ethylene-co-propylene-co-hexadiene)-g-styrene] and said step of purifying said monograft includes the steps of:
extracting said monograft product from unreacted backbone with n-pentane and precipitating into methanol; and, dissolving said monograft product in benzene and precipitating into acetone.

16. A process for the preparation of a bigraft copolymer, as set forth in claim 15, wherein said bigraft product comprises poly[(ethylene-co-propylene-co-hexadiene)-g-styrene-g-α-methylstyrene] and said step of purifying said bigraft includes the steps of:

separating said bigraft product from said monograft by refluxing in methyl ethyl ketone; and, dissolving said bigraft product in 3-pentanone.

17. A process for the preparation of a bigraft copolymer, as set forth in claim 15, wherein said bigraft product comprises poly[(ethylene-co-propylene-co-hexadiene)-g-styrene-g-isobutylene] and said step of purifying said bigraft includes the steps of:

separating said bigraft product substantially from said monograft by refluxing in 3-pentanone; and, dissolving said bigraft product in n-pentane substantially to remove homopolyisobutylene.

18. A process for the preparation of a bigraft copolymer from a backbone selected from the class consisting of saturated and unsaturated hydrocarbon homopolymers, copolymers and terpolymers said backbone carrying a first functional group capable of initiating cationic polymerization, and monomers forming a plurality of branches to be grafted therefrom selected from the class consisting of monovinyl aromatic compounds and isoolefins comprising the steps of:

substituting a second functional group, capable of initiating cationic polymerization and having a different reactivity from said first functional group, onto said backbone;

charging a reaction vessel with a suitable solvent, said backbone carrying said first and second functional groups and the first of said graft branch monomers;

adding a catalytic amount of an alkylaluminum compound with continuous mixing at a temperature of from about −5° C to about 20° C for a period of time of from about 2 minutes to 180 minutes so as to form a monograft copolymer wherein said first grafts are polymerized from said backbone at the site of said one of said functional groups;

terminating the reaction;

charging a reaction vessel with said monograft copolymer and the second of said graft branch monomers;

adding a catalytic amount of an alkylaluminum compound with continuous mixing at a temperature of from about −40° C to about 0° C for a period of time of from about 2 minutes to 180 minutes so as to form the bigraft copolymer wherein said second grafts are polymerized from said backbone at the site of the other of said functional groups; and, thereafter terminating the reaction and separating the bigraft product from the reaction vessel.

19. A process for the preparation of a bigraft copolymer, as set forth in claim 18, wherein said first and second functional groups are halogens.

20. A process for the preparation of a bigraft copolymer, as set forth in claim 19, wherein said second functional group is substituted on said halogenated backbone by the steps of:

charging a reaction vessel with said halogenated backbone carrying said first functional group, a suitable solvent and t-butylhypohalite;

illuminating the reactants by UV light for approximately 90–120 minutes; and, thereafter separating said backbone carrying said first and second functional groups from the reaction vessel.

21. A process for the preparation of a bigraft copolymer, as set forth in claim 18, wherein said first graft branch monomer is a monovinyl aromatic compound;

said solvent comprises a mixture of heptane and ethyl chloride; and, said first alkylaluminum compound has the formula $Al(M)_2X$ wherein M is selected from the group consisting of branched and straight chain alkyl groups having from 1 to about 12 carbon atoms, and X is selected from the group consisting of M, H and halogens.

22. A process for the preparation of a bigraft copolymer, as set forth in claim 21, wherein said monovinyl aromatic compound is styrene and said alkylaluminum compound is diethylaluminum chloride.

23. A process for the preparation of a bigraft copolymer, as set forth in claim 18, wherein said second graft branch monomer is different from said first graft branch monomer and is selected from the group consisting of a monovinyl aromatic compound and an isoolefin;

said solvent comprises a mixture of heptane and ethyl chloride; and, said second alkylaluminum compound has the formula $Al(M)_2X$ wherein M is selected from the group consisting of branched and straight chain alkyl groups having from 1 to about 12 carbon atoms, and X is selected from the group consisting of M, H and halogens.

24. A process for the preparation of a bigraft copolymer, as set forth in claim 23, wherein said monovinyl aromatic compound is α-methylstyrene, said isoolefin is isobutylene and said alkylaluminum compound is diethylaluminum chloride.

25. A process for the preparation of a bigraft copolymer, as set forth in claim 18, comprising the further steps of:

purifying said monograft and bigraft copolymer products.

* * * * *